(12) United States Patent
Hsiao

(10) Patent No.: US 7,000,567 B1
(45) Date of Patent: Feb. 21, 2006

(54) METHOD FOR GUIDING AQUATIC CRUSTACEANS BY UTILIZING THEIR BIOLOGICAL TENDENCY RESPONDING TO BRIGHT AND DARK CONTRAST

(76) Inventor: Shyh-Min Tom Hsiao, 56 269 Lane Lin-Tsen E. Rd., Chia-Yi City (TW) 600

( * ) Notice: Subject to any disclaimer, the term of this patent is extended or adjusted under 35 U.S.C. 154(b) by 0 days.

(21) Appl. No.: 10/929,901

(22) Filed: Aug. 30, 2004

(51) Int. Cl.
 *A01K 61/00* (2006.01)
(52) U.S. Cl. .................. 119/204; 119/207; 119/267
(58) Field of Classification Search ........... 119/201, 119/204, 207, 209, 246, 247, 248, 266, 267
 See application file for complete search history.

(56) References Cited

U.S. PATENT DOCUMENTS

| | | | | |
|---|---|---|---|---|
| 1,634,305 A | * | 7/1927 | Schrimp | 119/267 |
| 1,860,698 A | * | 5/1932 | Venditti | 119/267 |
| 3,316,882 A | * | 5/1967 | Renwick | 119/269 |
| 3,563,204 A | * | 2/1971 | Szilagyi | 119/267 |
| 3,749,901 A | * | 7/1973 | Clough | 362/562 |
| 3,951,104 A | * | 4/1976 | Neff | 119/216 |
| 4,006,711 A | * | 2/1977 | Frank | 119/256 |
| 4,026,243 A | * | 5/1977 | Jessop, III | 119/246 |
| 4,036,189 A | * | 7/1977 | Neff | 119/51.04 |
| 4,081,666 A | * | 3/1978 | Roehrick | 362/253 |
| 4,259,926 A | * | 4/1981 | Marliave | 119/208 |
| 4,379,437 A | * | 4/1983 | Knowles | 119/230 |
| 4,509,458 A | * | 4/1985 | Rines et al. | 119/217 |
| 5,066,394 A | * | 11/1991 | Harrison | 210/169 |
| 5,113,792 A | * | 5/1992 | Jones et al. | 119/221 |
| 5,160,431 A | * | 11/1992 | Marioni | 210/169 |
| 5,546,289 A | * | 8/1996 | Gordon | 362/101 |
| 5,713,303 A | * | 2/1998 | Willinsky et al. | 119/218 |
| 5,816,196 A | * | 10/1998 | Webster et al. | 119/228 |
| 6,158,386 A | * | 12/2000 | Limcaco | 119/245 |
| 6,203,170 B1 | * | 3/2001 | Patrick et al. | 362/234 |
| 6,305,324 B1 | * | 10/2001 | Hallock et al. | 119/248 |
| 6,346,262 B1 | * | 2/2002 | Levy | 424/408 |
| 6,347,908 B1 | * | 2/2002 | Safwat | 405/81 |
| 6,357,392 B1 | * | 3/2002 | Ido | 119/252 |
| 6,588,371 B1 | * | 7/2003 | Hallock et al. | 119/248 |
| 2005/0072368 A1 | * | 4/2005 | Hsiao | 119/211 |

\* cited by examiner

*Primary Examiner*—Yvonne R. Abbott
(74) *Attorney, Agent, or Firm*—Kusner & Jaffe

(57) ABSTRACT

A method for directing the displacement of aquatic crustaceans after feeding by utilizing their biological tendency responding to a bright and dark contrast is provided. This method comprises steps to generate the visual effect of this bright and dark contrast at a predetermined place within the water body of culture. Light coming from light emitters directly or from reflection of protrusions and/or painted patterns/figures, and/or filtration of light filters, with the existence of illuminating light, are used for generating visual effect of the bright and dark contrast.

20 Claims, 3 Drawing Sheets

METHOD FOR GUIDING AQUATIC CRUSTACEANS BY UTILIZING THEIR BIOLOGICAL TENDENCY RESPONDING TO BRIGHT AND DARK CONTRAST

BACKGROUND OF THE INVENTION

1. Field of the Invention

The present invention relates to methods for guiding aquatic crustaceans' locomotive orientation with their innate biological tendency responding to specific contrasts of bright and dark. This visual effect of bright and dark contrasts is generated at a predetermined area within these crustaceans' residing water body to attract their move toward the predetermined areas for staying or hiding.

2. Description of Related Art

Aquatic crustaceans are important economic aquatic animals. People usually obtain those animals by harvesting them from nature environments directly or by artificial cultivation. Many countries have paid great attention on their artificial cultivation as a business named aquaculture. Traditional aquaculture makes use of wide expanse of land and ponds with natural water supply. Only recently, several high-density culture systems have been disclosed. These systems use water recirculation equipments including filtration apparatuses to curtail both the consumption of water and land resources resulting in less damages to natural environments, like U.S. Pat. Nos. 4,368,691, 4,446,025 and 5,961,831. High-density cultivation systems bring larger profit margins but simultaneously increase the production loss resulting from cannibalization of animals densely living in the systems. This loss is derived from differences in size and living stage of cultured animals, ex. newly molted or immature crustaceans are usually vulnerable to predation of their none-molted and/or larger mates within the same body of water. This is the bottleneck in the efforts to elevate the culture density and hence to increase profits as well.

Cannibalism-avoiding behavioral management is thus an important task for maintaining cultivated aquatic crustaceans in above-said high-density systems. For that purpose, spatial separation of molting and none-molting crustaceans is one way to avoid molted animals from being predated. Several means to attract aquatic crustaceans' active moving can be employed in attempting to lure none-molting animals to stay away from molted ones. For example, traditional pond culture or tank culture uses deep water and wide space to passively reduce the contact between newly molted and none-molted crustaceans. In addition, scent/taste attractants and chemo-attractants are used to manage crustacean's displacement over feeding, breeding and hatching. U.S. Pat. No. 5,706,759 discloses a process to investigate potential chemo-stimulants, chemo-repelling agents or chemo-attractants for shrimp, but this invention still lacks further practical techniques for behavioral management in high-density culture. A kind of bait fluids, such as the fish oil, is used in U.S. Pat. No. 4,828,829 for harvesting crab only with expected higher efficiency. A food-luring trapper holding collected plankton or other similar shrimp food organisms is designed to allure and catch shrimp (U.S. Pat. No. 5,259,809). No other successful methods for managing the motion of aquatic crustaceans in light of their biological responses reacting to bright and dark visual stimuli have been developed previously.

Due to lack of proper techniques for fully managing aquatic crustaceans in high densities, the newly developed re-circulation systems have culture densities always maintained as a balance between cannibalization and growth, and, in shrimp, the culture pond or tank is always kept in certain water depth, about 0.6 to 2.0 meter, in order to reduce the incidence of cannibalizing behavior basing on the behavior that newly molted shrimp jump back or up away in order to escape from the attack of other none-molted shrimp mates. The culture water body with the depth of 0.6 to 2.0 meters has too large a mass to enable the development of multi-layered culture system and thus the traditional culture system is restricted to a planar installation.

In other fields, laboratories with crustaceans cultivated in controlled environments for research and markets like restaurants with crustaceans kept in tight space for display all face the same problems in behavioral management of aquatic crustaceans and are unable to maintain or display living crustaceans effectively in desired manners.

In nature, many aquatic crustaceans, such as shrimps, inhabit in water environments with bright-dark alternating or contrasting light effects appearing as wavy light reflections in shelters and crevices but not in open fields. Crustaceans may use these light effects to aim for a potential hiding place. Once arriving to the location, they may use their other senses to decide if they would take the action of hiding or go for another potential location.

Propensity for aquatic crustaceans to react to the bright and dark visual stimuli is a unique nature which can be used as a feasible means to guide their motion and localization. The present invention for guiding the displacement of aquatic crustaceans is centered upon the aforesaid biological tendency. This tendency responding to bright and dark contrast of crustaceans is not unique as it can be found in other animals, like insects. No practical concepts in the prior art, however, are disclosed as an efficient and effective process for guiding aquatic crustaceans' motion related to the techniques used in the present invention.

SUMMARY OF THE INVENTION

Specific dark and bright contrasts generated by artificial dynamic or static light-emitting sources directly or through reflection and filtration are used to attract aquatic crustaceans' active moving close to predetermined places.

Under that condition, dynamic and static lighting effects visible to aquatic crustaceans are used to define where the predetermined places are located. Overall consideration for designing such places has two steps. The first is for each of these places to attract the crustaceans to move close at time when they complete feeding and look for hiding locations. The second is for the attracted animals to initiate actual hiding, eating and other specific behavior at these predetermined places. The present invention only concerns the first step, especially the first step that can be activated by artificial lighting effects. The second step that involves the presence of a proper tactile structure and other conditions further established at the predetermined places is not included in this invention.

Accordingly, it is a goal of the present invention to provide a method to guide the motion and localization of aquatic crustaceans. The method for attracting aquatic crustaceans to move close to a predetermined place for hiding or staying after these crustaceans are fed full but prior to the status that these crustaceans are hungry again comprises the step of generating the effect of bright and dark contrast at the predetermined place within the body of water. The aforesaid predetermined place can therefore be distinguished into one or more first brightness sub-areas and one or more second brightness sub-areas, wherein the aforesaid first brightness sub-areas are brighter than the aforesaid second brightness sub-areas. The bright and dark contrast is the contrast between the first brightness sub-areas and connected or nearby second brightness sub-areas.

The above-said bright and dark contrast effect can be produced from one or more light-emitting sources directly and/or modified with reflection arrangements, of one or more painted figures and/or one or more sets of protrusions, and/or filtration setups, of one or more light filters.

The first brightness sub-areas and the second brightness sub-areas can be regularly or irregularly arranged and coexist simultaneously or in an unsynchronized fashion. The brightness level of each first and second brightness sub-areas is constant or changeable. Neither all of the above-said first brightness sub-areas are necessarily of same brightness nor all of the above-said second brightness sub-areas are necessarily of same brightness.

The predetermined place mentioned above is the place within the water body for culturing aquatic crustaceans that presents the visual effect of bright and dark contrast. The predetermined place is the region chosen from the bottom layer, walls or any other space from bottom up to the water surface of the water body intended for culturing crustaceans. Within the above-said chosen region, the bright and dark contrast can be spread, generated or projected on any floating attachable material and/or any fixed attachable material. The above-said effect of bright and dark contrast is generated by the apparatuses such as the above-said one or many light-emitting sources directly and/or modified with reflection arrangements, of one or more combinations of painted figures and/or one or more sets of protrusions, and/or filtration setups, of one or more filters of various designs. Such apparatuses for generating the effect of bright and dark contrast can be installed onto the above-said predetermined place directly, the nearby space above water or even the exterior side of the container's bottom layer as long as the effect of bright and dark contrast projected, spread or generated in the predetermined place can be received by the cultured crustaceans.

The above-mentioned apparatuses for generating the effect of bright and dark contrast includes one or more light-emitting sources of incandescent/fluorescent light bulbs or the LEDs directly, and/or one or more light filters, one or more shadow-producing protrusions and painted figures. If the above-listed apparatuses are not light emitting sources, one or more additional illuminating sources are adopted as an auxiliary device. The aforesaid light filter has structures of two or more light transparencies between and including 0 to 100%. A filter plate used in this invention, which has 0% transparency as the plate body and 100% transparency at its perforations, is an extreme case.

At the predetermined place, spots lighted up with glowing light bulbs and LEDs, by figures with higher light reflections, by protrusions facing light sources, and the illuminating light passing through the aforesaid perforations of a light filter are defined as the first brightness sub-areas, and the unlighted spots, with less illumination, with less reflected light and of shadow cast areas are defined as the second brightness sub-areas.

The present invention offers methods with the competence to manage the displacement of aquatic crustaceans in cultured water body. By directing the none-molting crustaceans to move into this predetermined area, the present invention offers a method to eliminate their cannibalistic action towards newly molted mates who would retract backward away from this predetermined area.

This present invention therefore contributes a risk reduction means for higher-density culture of aquatic animals leading to the acquirement of a higher ratio of benefit/cost in aquaculture industry.

The active reduction of cannibalism of this present invention also eliminates the need of culture-tank's high water depth (60–200 cm) expected to be helpful for cannibalism control. Thus, through making shadow-water culture possible, this present invention gives the feasibility to install shallow-water tanks into a multi-layered culturing system. Moreover, the central idea in the present methods for guiding aquatic crustaceans, which based upon the biological propensity responding to bright and dark contrast, is also effective to various kinds of insects besides the aquatic crustaceans mentioned in this invention, and it could be applied to many kinds of fields, such as aquaculture and agriculture including trapping and gathering of cultured animals for feeding and harvesting and managing captivated animals for exhibition, etc.

BRIEF DESCRIPTION OF THE DRAWINGS

In the drawings:

FIGS. 1–5 are schematic drawings of apparatuses for generating the visual effect of bright and dark contrasts used in the present invention for guiding aquatic crustaceans by utilizing their biological tendency responding to the visual stimuli.

FIG. 1 is a schematic presentation of a light-reflector installed at the bottom portion of the water body of culture, which is constituted by a grid-like pattern created by dark-colored adhesive tapes or paints applied on the bottom of a culture container.

FIG. 3 is a schematic presentation of a light sifting filter plate providing the specific effect onto a predetermined place at the bottom portion of the water body of culture.

FIGS. 4 and 5 are schematic presentations of networks of wall-like and cone-like protrusions respectively installed at the bottom portion of the water body of culture.

DETAILED DESCRIPTION OF THE PREFERRED EMBODIMENTS

Figure 1:
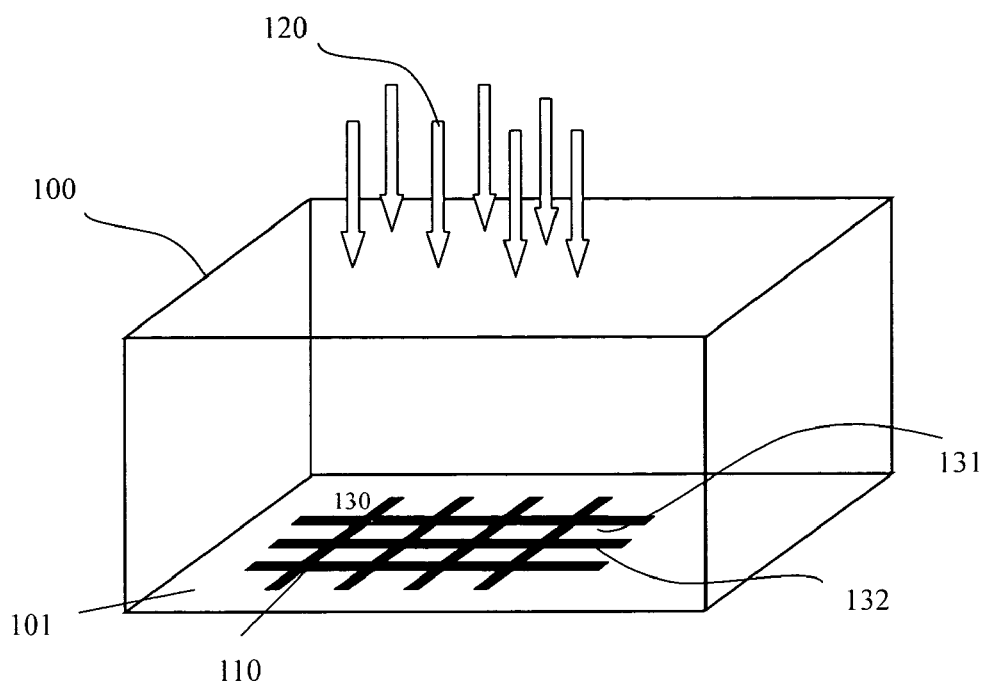

The present invention provides methods to guide the displacement of aquatic crustaceans.

The method for attracting aquatic crustaceans to move close to a predetermined place for hiding or staying after theses crustaceans are fed full but prior to the status that these crustaceans are hungry again comprises the step of generating the effect of bright and dark contrast at the predetermined place within the water body of culture. The aforesaid predetermined place can therefore be distinguished by its composition of one or more first brightness sub-areas and one or more second brightness sub-areas.

The bright and dark contrast is the contrast between an above-said first brightness sub-area and an above-said second brightness sub-area. The aforesaid first brightness sub-areas are brighter than the aforesaid second brightness sub-areas.

The predetermined place within the water body of culture is the place, presenting the visual effect, chosen from the bottom surface, the walls, or any space from bottom up to the water surface of the water body of culture. Within the above-said chosen region, the bright and dark contrast can be generated, projected, painted and/or spread, on any floating attachable material and/or any fixed attachable material.

The above-said effect of bright and dark contrast is generated by one or many light-emitting sources directly or, modified by reflection of one or more combinations of painted figures and/or one or more sets of protrusions, and/or by filtration of one or more filters with various filtration effects. Such light-emitting sources, light-reflecting or light filtering apparatuses/materials can be installed onto the above-said predetermined place directly, the nearby space above water or even the exterior side of the container's bottom layer as long as the effect of bright and dark contrast generated, projected, spread and/or painted at the predetermined place can be received by the cultured crustaceans.

The size and depth of a container carrying the water body of culture can vary according to the species and size of aquatic crustaceans reared in practice without specific limitations. For white shrimps, *Litopenaeus vannamei*, they can be cultured in a water body of about 10 cm depth, which is much less than the 60 cm to 200 cm depth in traditional marine culture for shrimp like blue shrimp, *Penaeus setiferus*, white shrimp, *Litopenaeus vannamei*, tiger shrimp, *Penaeus monodon*, and Kuruma shrimp, *Panaeus japonicus*.

The first brightness sub-areas and the second brightness sub-areas can be regularly or irregularly arranged and produced simultaneously or in an unsynchronized fashion. Modifying position or angle of the light reflecting/filtering apparatuses (such as the aforesaid painted figures, protrusions and filters) and/or the coexisted illuminating sources or changing the arrangement of the light emitters is capable of altering the brightness or the shape of each first or second brightness sub-area. Moreover, shapes, arrangements and reflection levels of the figures, the structure and characteristics of the filters are also ready to be adjusted in order to create the desired brightness in both first and second brightness sub-areas. The brightness of each first or second brightness sub-area is constant or changeable. Neither all first brightness sub-areas are necessarily of same brightness nor all second brightness sub-areas are necessarily of same brightness, if number of the first brightness sub-area and/or the second brightness area is larger than one.

Figure 3:
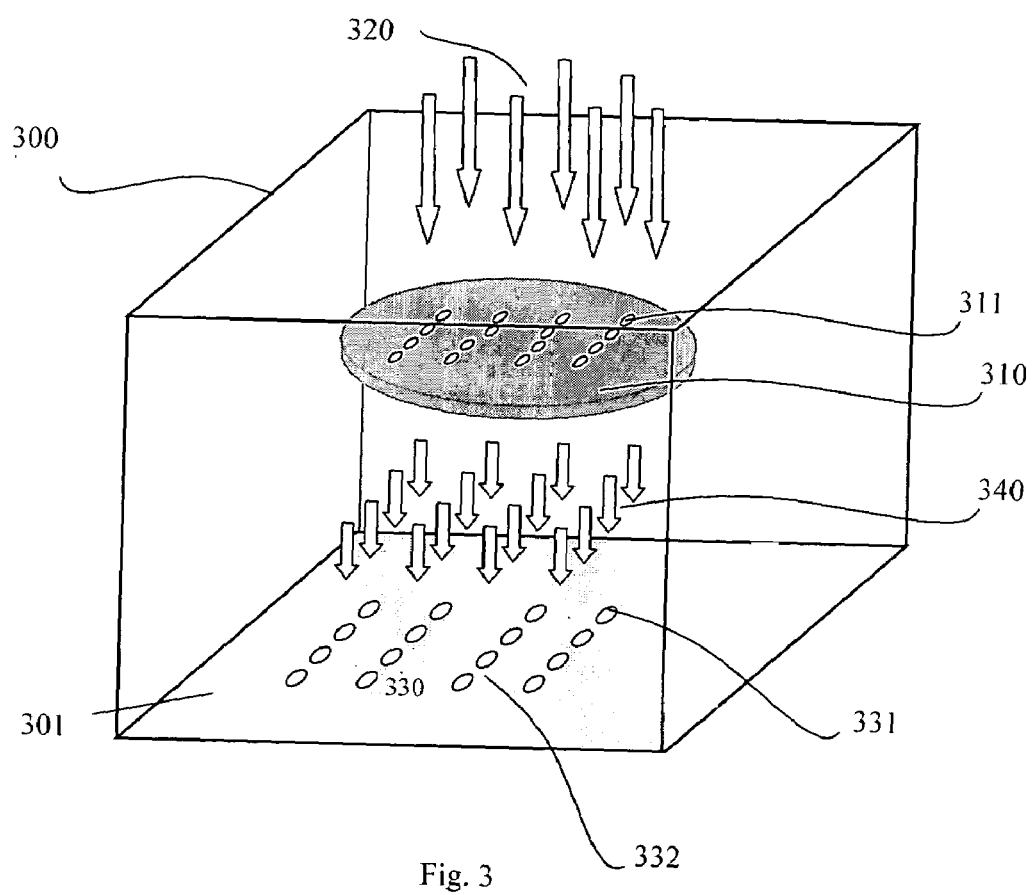
Figure 4:
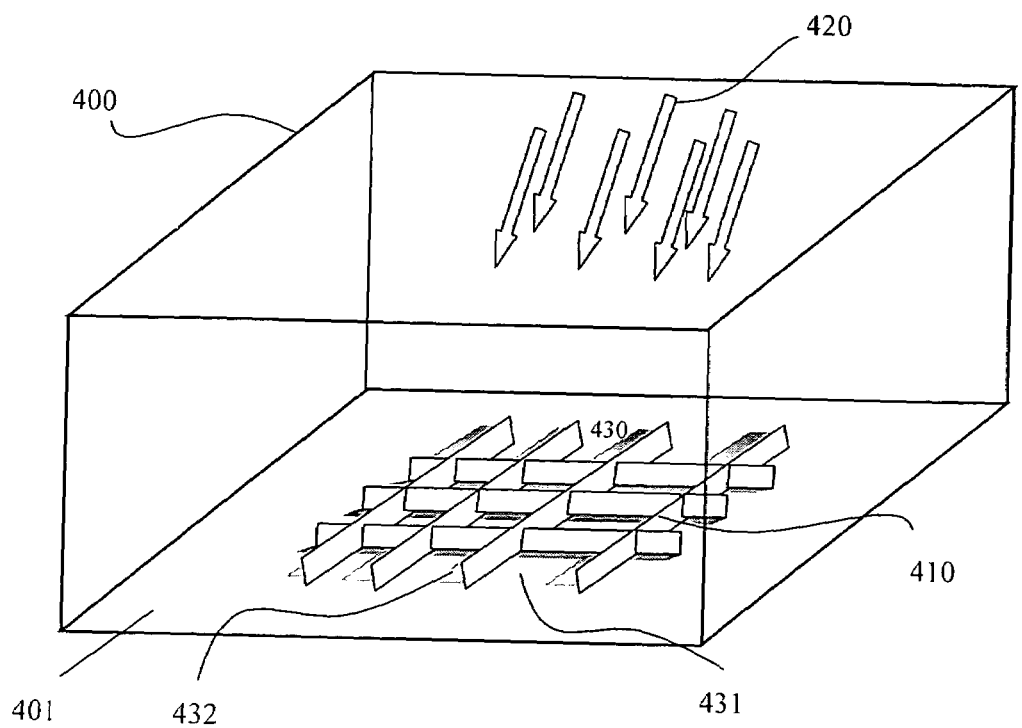
Figure 5:
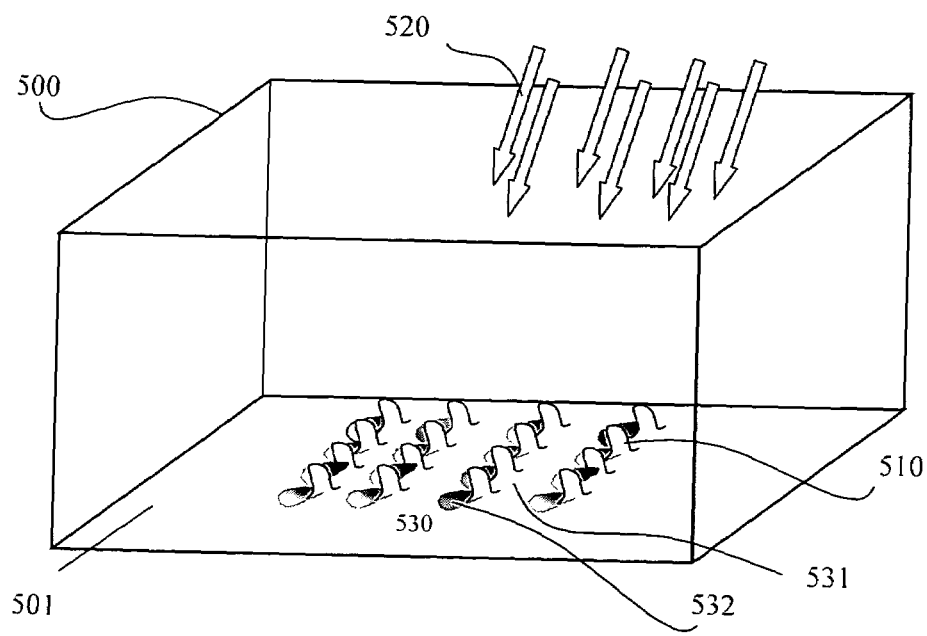

The bright and dark contrast can be produced directly from a light-emitting source directly (see FIGS. 2*a* and 2*b*), or with a filter plate (see FIG. 3), a light-reflecting painted figure (see FIG. 1) and light reflection networks of protrusions (see FIGS. 4 and 5).

When a light-emitter like LEDs or fluorescent/incandescent light is selected, it could be used as the light emitting source for generating the contrast effect directly and can be closely deployed at a predetermined place. Single or multiple said emitters, with/without same brightness, are both able to be utilized to generate the bright and dark contrast. On/off manipulations of the emitters, the differences between the emitters' brightness and the brightness differences between the surrounding less illuminated places and the places lighted by emitters all can produce aforementioned bright and dark contrast.

Figure 2A:
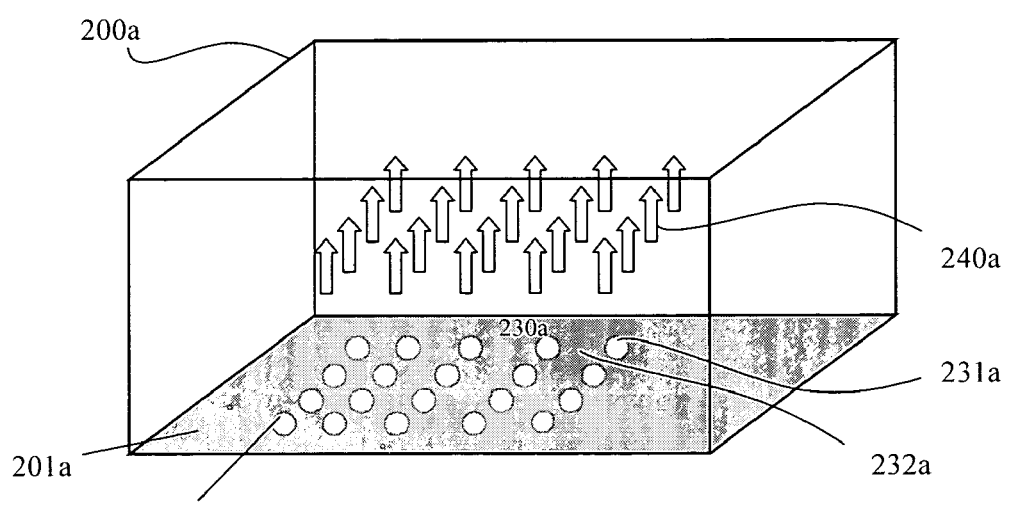
FIG. 2a is a schematic presentation of LED light-emitters installed at the bottom portion of the water body of culture, forming an array-like regular pattern.
Figure 2B:
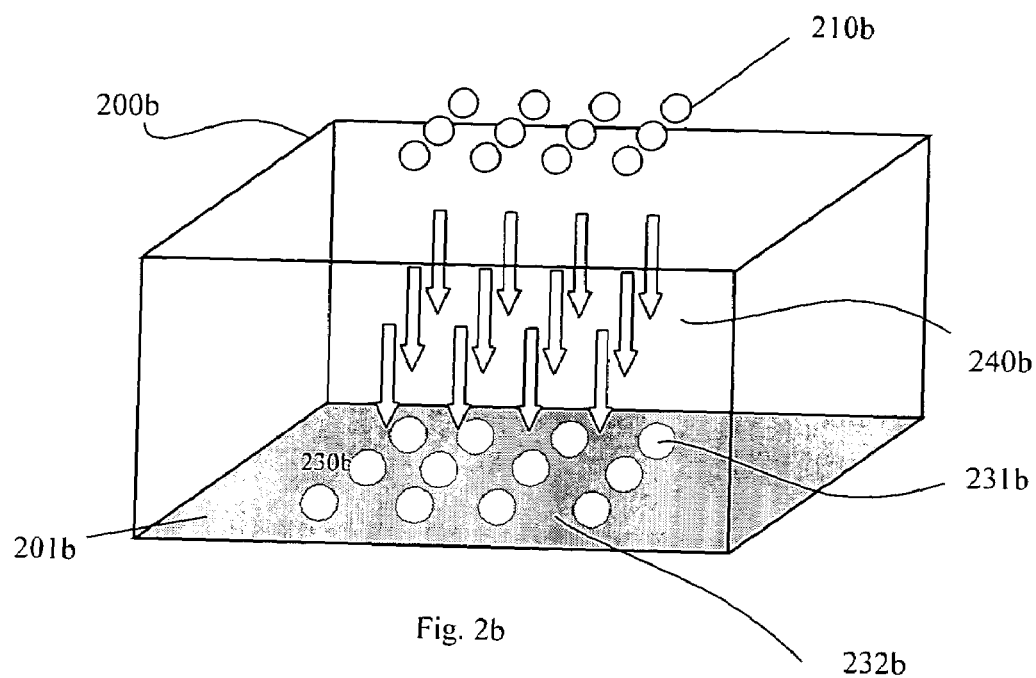
FIG. 2b is a schematic presentation of LED light-emitters installed above the water body of culture, forming an array-like regular pattern.

The preferred embodiment adopts multiple numbers of emitters, like FIGS. 2*a* and 2*b*, with on/off manipulations, producing effective contrast of bright and dark. Considering high burn-out consumption of emitters due to repeatedly turning them on and off, an area deployed with persistently glowing emitters in a loosely arranged pattern with space in between is preferred. This loose pattern of emitters can be made by a plurality of individual emitter or emitter group irregularly dispersedly or regularly arranged. On the other hand, on/off manipulations of single or multiple emitters, which is grouped or not, is also sufficient to produce the bright and dark effects, and emitters in such condition, can flash synchronously, alternatively or totally in an unsynchronized fashion. As known in the art, a transparent structure or material (not shown in the figure) may cover over the light emitters to prevent them from immersion in water.

When a light-reflector/filter is chosen, such as the flat area with painted figures of different reflection levels, see FIG. 1, protrusions which form shadows by reflecting a portion of illuminating light, see FIGS. 4 and 5, a filter which has sub-areas with different light transparencies (between and including 100% and 0%) and can thus serves as a sieve that creates an effective image of dark and bright contrast through and onto the bottom of the water body of culture, see also FIG. 3, there should be an auxiliary illuminating source, outside and/or inside the water body of culture.

The first brightness sub-areas and the second brightness sub-areas derived from the light emitting sources directly or with filters, or from the light reflecting sources can be shaped into linear, square, round, hexagon-like or any kind of geometric or non-geometric figures and arranged into rows, circles, grids or regular/irregular styles. The illuminating sources used to shine on filters, painted figures or protrusions are commercially available light bulbs or LEDs; normally, light that generates a light intensity at 1–300 lux at the surface of or within the water body of the culture is used.

Position of the light filter is chosen between bottom of the culture container and the illuminating source in order to form a light pattern mixed with shadow and lighted spots at the bottom or through the water body of culture, see FIG. 3. In one preferred embodiment, this filter can be installed under the water surface of the water body of culture to further providing the cultured crustaceans with a tangible and attachable structure for hiding and staying. Both the brighter areas, defined as the first brightness sub-areas derived from the illuminating light passing through the high-transparency openings in the filter, and the less-bright areas, defined as the second brightness sub-areas derived from the illuminating light blocked by the none-opening, or less-transparent, areas of the filter, jointly result in the formation of the bright-dark contrast.

The painted figures, images created by light filters and/or protrusions can be deployed directly into the predetermined place. Areas surrounding the predetermined place can be further lighted with even or graded intensities to enhance the attracting effects built into the predetermined place.

The aquatic crustaceans in the present invention include, but not limited to, shrimp and crab; wherein *Litopenaeus vannamei, Penaeus monodon, Penaeus setiferus* and *Panaeus japonicus* are preferable.

In one embodiment, the cultured aquatic crustacean is white shrimp, *Litopenaeus vannamei*, depth of the water body is of 10 cm. A filter plate, containing perforations of one size or various sizes at 0.2 to 2 cm in diameter, is placed 4 to 9 cm deep into the water. A fluorescent illuminating light source evenly reaches to the water surface with a light intensity at 10–60 lux shines to the underwater filter plate. While light reaches to the filter, a part of it goes through perforations and the rest of it is blocked by the none-opening portion of the filter, an effect of bright and dark contrast is thus created at the predetermined place. For white shrimp, a bright and dark contrast with 25 lux at the first brightness sub-areas and 5 lux at the second brightness sub-areas has been found very effective. That is white shrimp of various weight (each of 0.05 to 40 g) are observed to approach the predetermined place effectively after feeding. Moreover, the shrimp of large numbers can be seen to hide under this properly arranged light-filter plate as short as 30 minutes after feeding.

The overall apparatuses for generating the effects of bright and dark contrast are shown in FIG. 1~5 and described in following embodiments.

In embodiment 1, see FIG. 1, strip-like dark colored figures, constructed with dark paint or adhesive tape, are combined into a grid-like pattern 110 deployed onto a predetermined place 130 at the bottom 101 of the container 100. The deep-colored regions 132 and the un-painted region 131 at the predetermined place 130 respectively construct the aforesaid second brightness sub-areas and the aforesaid first brightness sub-areas, jointly these sub-areas constituting the bright and dark contrast under the illuminating source 120.

In embodiment 2, see FIG. 2a, light-emitters 210a arranged into an array is the direct origin of the bright and dark contrast. The emitter 210a can be a LED, a fluorescent light bulb, an incandescent light bulb or any of other light sources. A LED is preferred here because it is economical and durable. However, the fluorescent light bulb is also preferred considering its low price and availability. The emitter 210a's array is placed at the bottom 201a of the container 200a. And the predetermined place 230a can thus be distinguished into several less illuminated sub-areas 232a, intended to be the second brightness areas, and several illuminated sub-areas 231a, intended to be the first brightness area. The emitters glow persistently or alternatively and their brightness is constant or changeable. In this embodiment, a plurality of individual LED glowing persistently is preferred because of its easy installation and management.

In embodiment 3, see FIG. 2b, light-emitters 210b arranged into an array is the origin of the bright and dark contrast. The emitter 210b can be a LED, a fluorescent light bulb, an incandescent light bulb or any of other light sources. A LED is preferred here because it is economical and durable. However, the fluorescent light bulb is also preferred considering its low price and availability. The emitter 210b's array is not placed at the bottom 201b of the container 200b like the case in embodiment 2 but instead placed above surface of the water body of culture loaded into container 200b. With the emitter 210b's array image projecting on, the predetermined place 230b can thus be distinguished into several less illuminated sub-areas 232b, intended to be the second brightness areas, and several illuminated sub-areas 231b, intended to the first brightness areas. The emitters glow persistently or alternatively and their brightness is constant or changeable. In this embodiment, a plurality of individual LED glowing persistently is preferred because of its easy installation and management.

In embodiment 4, see FIG. 3, a perforated filter plate 310 with 100% light transparency at its perforations 311 and 0% light transparency at the rest of the plate surrounding perforations 311 is adopted to sift the illuminating light 320. Several light columns 340 are formed and therefore the filter plate produces simultaneously several illuminated sub-areas 331, intended to be the first brightness sub-areas, and the under illuminated sub-areas 332, intended to be the second brightness sub-areas. Both sub-areas jointly constitute the effect of bright and dark contrast at and above the predetermined area 330 on bottom 301 of container 300.

The filter plate 310 can be an opaque round plate of PVC-like material constructed as a horizontal light filter, but its shape, material and position angle respectively are not limited to be round, PVC and horizontal. Other shapes, materials and/or position suitable for generating intended effects are usable. Shape of the opening 311 is not limited to be a round hole and size of each opening 311 is of one size or various sizes of 0.1 to 8 cm in diameter. The distance of 0.1 to 8 cm between neighboring perforations 311 has been tested to be effective. The perforations 311, although they have 100% light transparency in this embodiment, other materials/structures contributing to different light transparency can be adopted. The light transparency of the filter plate itself is also adjustable.

Position of the filter 310 is located between the bottom layer 301 and the illuminating source 320, either above the surface of or immersed in, the water body of culture loaded in container 300. When this light-filtering plate immersed into the water 2–9 cm deep, it has been proved to be effective not only for attracting fed white shrimp but also creating a tactile sensation that enhances *Penaeus setiferus* and *Litopenaeus vannamei's* hiding behavior at predetermined place 330 where the said bright and dark contrast is present.

In embodiment 5, see FIG. 4, a network of thin-wall protrusion 410 is installed on bottom 401 of container 400 at a predetermined place 430. This network of protrusion 410 is formed by interlacing thin-wall plates into a grid-like pattern sitting vertically on the predetermined place 430 at bottom 401 of container 400. The height of the network of protrusion 410 in this embodiment is of 0.1 to 8 cm and the distance between two neighboring parallels of protrusion plates is of 0.1 to 8 cm. A bright and dark light contrast effect can be produced by projecting light source 420 in an angle toward network 410. Range of the aforesaid height of and distance between protrusion plates can be adjusted depending on size and species of the cultured animals and/or angles of the illuminating light. Shadow sub-areas 432 derived from shade of the network of protrusion 410 under illuminating light 420 are intended to be the second brightness sub-areas which constitutes the bright and dark contrast when in combination with lighted sub-area 431, intended to be the first brightness sub-areas. This embodiment has an additional advantage that it also provides habitable shelters facilitating the staying and hiding activities of aquatic crustaceans at predetermined place 430 after they have been attracted to it.

In embodiment 6, see FIG. 5, within container 500, a network of cone like protrusion 510 is constructed at a predetermined place 530 on container bottom 501 as a variation of the present invention. Shape of the protrusion 510 includes, but not limited to, a column-like or a taper shape. The network of protrusion 510 forms lighted sub-areas 531 and casts shadowed sub-areas 532 under angled illuminating light 520. The shadowed sub-areas 532 are intended to be the second brightness areas and the lighted sub-areas 531 are intended to be the first brightness sub-areas. Both, the first and second sub-areas combined, constitute the effect of bright and dark contrast. Height of the protrusion 510 in this embodiment is of 0.1 to 8 cm and distance between two neighboring protrusions 510 is 0.1 to 8 cm. Range of the aforesaid height and distance can be adjusted depending on size and species of the cultured animals and/or angle of illuminating light 520.

The area of the predetermined place depends on species and size of animals reared and the size of culture container in use. It is preferred to have the area of the predetermined place and the rest of the container's bottom in a ratio like 1:1; in one culture test, such ratio has led to lowered cannibalization incidents. Thus, the area surrounding the predetermined place with brightness of even or gradually grading quality may be further applied into the above-mentioned embodiments to facilitate movement of none-molted crustaceans searching for their hiding place at the predetermined place and leave alone newly molted mates who have backward retraction ability to move and stay in the area surrounding but away the predetermined place.

With the present method, construction of a tank having at least one predetermined area expressing the effect of bright-dark contrast can culture aquatic crustaceans at an increased density and at a reduced depth of the culture container to almost 10 cm still with cannibalization under control. A multi-layered culture system construction is therefore feasible due to reduction of water body in each culture layer. For culturing aquatic crustaceans and other animals, being able to have multi-layered culture greatly increases the space utilization efficiency of each square meter of a production area. The results generated in one embodied multi-layered system while culturing Litopenaeus vannamei are shown in Table 1.

The culture density of each square meter production floor is calculated as the total weight of shrimp cultured in 10-layered culture system, with 10 individual culture layers stacking one above the other, divided by the square area covered by the culture system which is equal to the bottom area of each individual culture layer. This table depicts that by using this 10-layered culture system with technology of the present invention in place, a very high production efficiency at a density of 10 kg or more Litopenaeus vannamei per square meter production floor can be attained with reduced cannibalism (expressed as nearly 100% survival rates). This is a significant improvement over the density of 0.73 kg marine shrimp produced over per square meter pond area (calculated by the data published in the annual report of Taiwan, R.O.C. Council of Agricultural Affairs on fishery in 1987, which is the most successful year of marine shrimp culture in Taiwan and the yield was 80,000 tons for 11,000 hectares of land used).

TABLE 1

1. Growth progression data of white shrimp (Litopenaeus vannamei) juveniles in one test group

| Date | Density* $(kg/m^2)$ | Weight per shrimp (gram) | Weekly growth (%) | Survival rate (%) | Total number of shrimp in sampled layer |
|---|---|---|---|---|---|
| Feb. 12, 2001 | 3.89 | 0.86 | | | 448 |
| Feb. 19, 2001 | 4.7 | 1.05 | 22 | 99.11 | 444 |
| Feb. 26, 2001 | 6.72 | 1.52 | 45 | 98.87 | 439 |
| Mar. 05, 2001 | 9.18 | 2.09 | 39 | 99.09 | 435 |
| Mar. 12, 2001 | 10.42 | 2.43 | 16 | 97.47 | 424 |

2. Progression data of juvenile white shrimp growing into young shrimp in one test group

| Date | Density* $(kg/m^2)$ | Weight per shrimp (gram) | Weekly growth (%) | Survival rate (%) | Total number of shrimp in sampled layer |
|---|---|---|---|---|---|
| Mar. 26, 2001 | 9 | 2.8 | | | 318 |
| Apr. 02, 2001 | 11.26 | 3.52 | 25 | 99.69 | 317 |
| Apr. 09, 2001 | 13.59 | 4.27 | 21 | 99.37 | 315 |

3. Growth progression data of young white shrimp in one test group

| Date | Density* $(kg/m^2)$ | Weight per shrimp (gram) | Weekly growth (%) | Survival rate (%) | Total number of shrimp in sampled layer |
|---|---|---|---|---|---|
| Mar. 19, 2001 | 10.72 | 4.41 | | | 251 |
| Mar. 26, 2001 | 12.48 | 5.04 | 14 | 97.61 | 245 |
| Apr. 02, 2001 | 13.18 | 5.44 | 8 | 97.96 | 240 |

4. Summary data of growing large white shrimp in two test groups

| Date | Density* $(kg/m^2)$ | Weight per shrimp (gram) | Weekly growth (%) | Survival rate (%) | Total number of shrimp in sampled layer |
|---|---|---|---|---|---|
| April 2001 (11 days) | 22.2 | 17.0–17.9 | 3.3 | 100 | 47 |
| April 2000 (12 days) | 19.3 | 16.1–17.4 | 5.0 | 100 | 42 |

The inventive subject matter being thus described, it will be obvious that the same may vary in many ways. Such variations are not to be regarded as a departure from the spirit and scope of the inventive subject matter, and all such modifications are intended to be included within the scope of the following claims.

What is claimed is:

1. A method for attracting aquatic crustaceans to move to a predetermined place, which comprises the steps of:
   providing a container in which a water body of culture is loaded; and
   generating an effect of bright and dark contrast at said predetermined place inside said container;
   wherein said predetermined place is selected from the group consisting of a region of said container's bottom portion under the water surface of said water body of culture, a region of said container's wall under the water surface of said water body of culture, a region at or under the water surface of said water body of culture on a floating attachable material and a region at or under the water surface of said water body of culture on a fixed attachable material; and
   whereby said predetermined place can be distinguished into a first brightness sub-area and a second brightness sub-area and said first brightness sub-area is brighter than said second brightness sub-area.

2. The method of claim 1, wherein said effect of bright and dark contrast is generated by a light emitting source.

3. The method of claim 1, wherein said effect of bright and dark contrast is generated by a combination of geometrical or non-geometrical patterns with different levels of brightness.

4. The method of claim 1, wherein said effect of bright and dark contrast is generated by a light filter capable of sifting light.

5. The method of claim 1, wherein said effect of bright and dark contrast is generated by a plurality of protrusions capable of producing shadows of said protrusions.

6. A method for attracting a shrimp and/or a crab to move to a predetermined place, which comprises the steps of:
provided a container in which a water body of culture is loaded; and
generating an effect of bright and dark contrast at said predetermined place inside said container;
wherein said predetermined place is selected from the group consisting of a region of said container's bottom portion under the water surface of said water body of culture, a region of said container's wall under the water surface of said water body of culture, a region at or under the water surface of said water body of culture on a floating attachable material and a region at or under the water surface of said water body of culture on a fixed attachable material; and
whereby said predetermined place can be distinguished into a first brightness sub-area and a second brightness sub-area and said first brightness sub-area is brighter than said second brightness sub-area.

7. The method of claim 6, wherein said effect of bright and dark contrast is generated by a light emitting source.

8. The method of claim 6, wherein said effect of bright and dark contrast is generated by a combination of geometrical and/or non-geometrical patterns with different levels of brightness.

9. The method of claim 6, wherein said effect of bright and dark contrast is generated by a light filter capable of sifting light.

10. The method of claim 6, wherein said effect of bright and dark contrast is generated by a plurality of protrusions capable of producing shadows of said protrusions.

11. A method for attracting at least one of the following species, *Litopenaeus vannamei, Penaeus monodon, Penaeus setiferus* and *Panaeus japonicus*, and/or a crab to move to a predetermined place, which comprises the steps of:
providing a container in which a water body of culture is loaded; and
generating an effect of bright and dark contrast at said predetermined place inside said container;
wherein said predetermined place is selected from the group consisting of a region of said container's bottom portion under the water surface of said water body of culture, a region of said container's wall under the water surface of said water body of culture, a region at or under the water surface of said water body of culture on a floating attachable material and a region at or under the water surface of said water body of culture on a fixed attachable material; and
whereby said predetermined place can be distinguished into a first brightness sub-area and a second brightness sub-area and said first brightness sub-area is brighter than said second brightness sub-area.

12. The method of claim 11, wherein said effect of bright and dark contrast is generated by a light emitting source.

13. The method of claim 11, wherein said effect of bright and dark contrast is generated by a combination of geometrical or non-geometrical patterns with different levels of brightness.

14. The method of claim 11, wherein said effect of bright and dark contrast is generated by a light filter capable of sifting light.

15. The method of claim 11, wherein said effect of bright and dark contrast is generated by a plurality of protrusions capable of producing shadows of said protrusions.

16. A method for attracting at least one of the following species, *Litopenaeus vannamei, Penaeus monodon, Penaeus setiferus* and *Panaeus japonicus*, to move to a predetermined place, which comprises the steps of:
providing a container in which a water body of culture is loaded; and
generating an effect of bright and dark contrast at said predetermined place inside said container;
wherein said predetermined place is selected from the group consisting of a region of said container's bottom portion under the water surface of said water body of culture, a region of said container's wall under the water surface of said water body of culture, a region at or under the water surface of said water body of culture on a floating attachable material and a region at or under the water surface of said water body of culture on a fixed attachable material; and
whereby said predetermined place can be distinguished into a first brightness sub-area and a second brightness sub-area and said first brightness sub-area is brighter than said second brightness sub-area.

17. The method of claim 16, wherein said effect of bright and dark contrast is generated by a light emitting source.

18. The method of claim 16, wherein said effect of bright and dark contrast is generated by a combination of geometrical or non-geometrical patterns with different levels of brightness.

19. The method of claim 16, wherein said effect of bright and dark contrast is generated by a light filter capable of sifting light.

20. The method of claim 16, wherein said effect of bright and dark contrast is generated by a plurality of protrusions capable of producing shadows of said protrusions.

* * * * *